Sept. 26, 1950        L. D. BIZAK        2,523,493

AUTOMATIC CONTROL FOR MIXING VALVES

Filed July 21, 1948

INVENTOR
LOUIS D. BIZAK

BY *Hyde, Meyer, Baldwin & Doran*

ATTORNEYS

Patented Sept. 26, 1950

2,523,493

UNITED STATES PATENT OFFICE 2,523,493

AUTOMATIC CONTROL FOR MIXING VALVES

Louis D. Bizak, Cleveland, Ohio

Application July 21, 1948, Serial No. 39,928

2 Claims. (Cl. 236—12)

The invention relates to novel and improved thermostatically controlled mixing valve means for a hot and cold water supply system for use, for example, in bath tubes, shower baths, sinks, automatic washing machines, or the like.

An object of the invention is to provide novel mixing valve means of relatively simple construction which can be readily and cheaply manufactured from a relatively few constituent parts, and which, when assembled, is of sturdy character so that it will function satisfactorily for an extended period without need for repair or replacement of parts.

Further objects and advantages of the invention will be apparent from a study of the following description in conjunction with the accompanying drawings in which.

Figure 2:
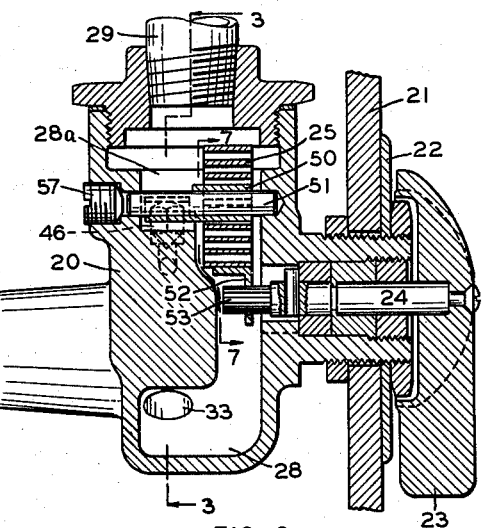
Fig. 2 is a vertical sectional view taken on the line 2—2 of Fig. 1.
Figure 3:
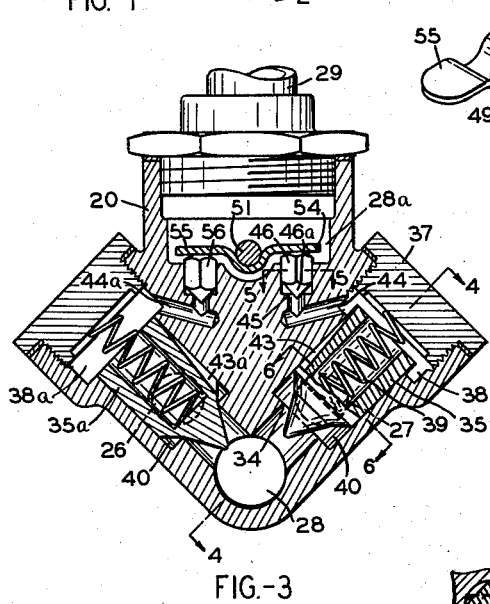
Fig. 3 is a sectional view taken on the line 3—3 of Fig. 2.
Figure 4:
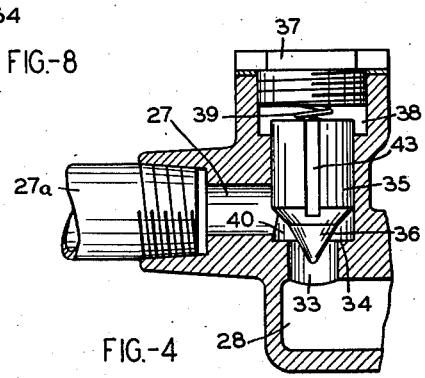
Figure 6:
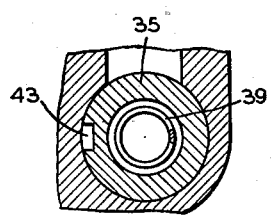
Figure 5:
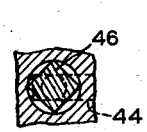
Figure 7:
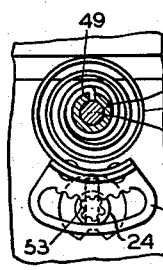

Figs. 4, 5 and 6 are sectional views taken respectively on the lines 4—4, 5—5, and 6—6 of Fig. 3;

Fig. 7 is a sectional view taken on the line 7—7 of Fig. 2; and

Figure 8:
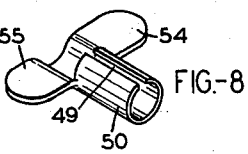

Fig. 8 is a perspective view of one of the operating elements.

Before the present invention is disclosed in detail it is to be understood that such invention is not limited to the details of construction or the specific arrangement of parts herein illustrated or described as the invention obviously may take other forms. It also is to be understood that the phraseology or terminology herein employed is for the purpose of description and not of limitation.

My invention comprises a thermostatic valve mechanism for controlling the temperature of water or other liquid receivable from hot and cold supply sources. The thermostatic control may be preset for any desired temperature.

Referring now to the drawings, reference numeral 20 denotes generally a hollow valve body which in the embodiment illustrated is adapted for delivering water at a predetermined temperature to a shower bath spray fixture (not shown). The valve body is disposed behind a shower stall partition 21. The front of the partition carries a dial plate 22 which may be marked with suitable indicia to denote water temperatures. A control handle 23 is fixed to a shaft 24, said shaft extending through partition 21, and operatively affecting the operation of a thermostatic control member 25 within valve body 20, as will appear.

The valve body is supplied with hot and cold water through respective inlet ports 26 and 27 in the rear wall of the body, the cold water port 27 and pipe 27a being best shown in Fig. 4. The inner ends of said supply passages converge to a juncture in a mixing channel or chamber 28 which turns laterally and then upwardly within the valve body so as to eventually communicate with the water delivery pipe 29 at the top of the valve body as best seen in full vertical extent in Fig. 2.

Since the water supply passages ahead of their point of convergence are similarly constructed, the control for one only will be more fully described. The downward leg 33 of the cold water supply passage 27, between said passage and the mixing channel 28, is provided with a necked orifice portion affording an annular shoulder 34. Vertically above said shoulder the valve body is bored out to receive a reciprocable, free floating valve member 35 having a downwardly seating conical head portion 36 which in its bottom position seats on shoulder 34 to cut off the cold water flow to the mixing chamber. A screw threaded cap 37 closes the upper end of the bore 38. Between cap 37 and valve 35 is a helical spring 39 which biases valve 35 to its seat with relatively light pressure, sufficient only to keep the valve seated if it is mounted in inverted position and to eliminate circulation when the water supply is turned off. Since the incoming water always has access to the lower valve face around the cutback portion 40 of the bore (Fig. 4), the water pressure is upwardly effective against the conical valve head 36 so as to normally tend to unseat valve 35.

The chambered portion 38 of the valve bore, between the valve top and the cap 37, will be herein termed, for convenience, a pressure equalizing chamber, for reasons which will hereinafter appear.

Valve 35, which is herein for convenience termed a regulating valve, is provided with a tapered slot 43, which increases in depth in a downward direction as best seen in Fig. 3. The purpose of this slot is to permit limited passage of water upwardly from the leg 33 of the cold water supply passage to the pressure equalizing chamber 38. A certain amount of water seepage always occurs past the piston as long as there is differential pressure above and below the piston. It will be apparent that upward or downward movement of piston 35 respectively increases or decreases the amount of water which can pass through slot 43 to chamber 38. The significance of this fact will soon appear.

The pressure equalizing chamber 38 is provided with an escape passage 44 leading to the outlet end 28a of the mixing channel 28 (Fig. 3). The escape passage is provided with an annular shoulder 45 which serves as a seat for a control valve 46 which has a conical face 46a seatable on said shoulder by downward movement of the valve. As best seen in Fig. 5, the body of valve 46 is square in cross section, and rides in a cylindrical passage so as to permit free passage of such limited amount of liquid as may pass between face 46a and seat 45 when the valve opens. Just as in the case of the regulating valve 35 heretofore described upward or downward movement of control valve 46 respectively increases or decreases the size of the annular clearance between the valve 46 and seat 45.

A thermostatic element 25 of helical strip character is disposed in the upper end 28a of the mixing channel, its inner end is seated in a slot 49 in a bushing 50 (Fig. 7) which is slipped on a shaft 51 journaled in opposite walls of the body 20. The outer end of the helical strip has fixed thereon a rack member 52 operatively engageable with a pinion 53 on control shaft 24, previously described. Bushing 50 has attached thereto a pair of laterally extending arms 54 and 55 (Figs. 3 and 8) adapted to be swingable into or out of abutment with control valves 46 and 56 respectively so as to permit and control opening movement of either valve. In the position shown in Fig. 3, for example, arm 55 has been rocked downwardly to close valve 56, while arm 54 has been rocked upwardly to permit opening of valve 46. Rocking of arms 54 and 55 is of course directly responsive to rotation of the slotted bushing which in turn is rotated by expansion or contraction of thermostatic element 25 responsive to temperature changes in the mixing channel. Rotation of control knob 23, and hence rotation of its shaft 24, determines a fixed end position of the thermostat for any temperature desired. A screw threaded plug 57 closes the outer end of the bore in which shaft 51 is journaled.

Figure 1:
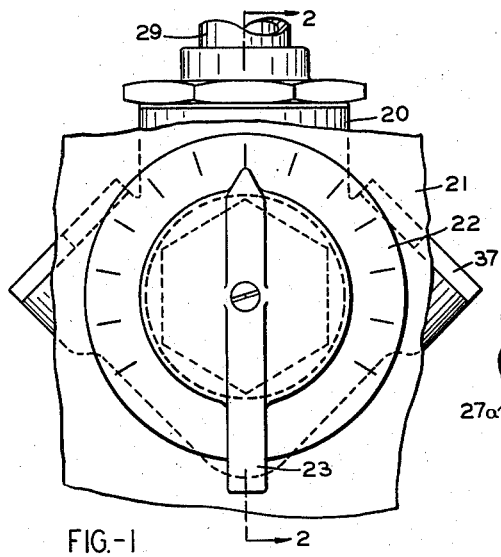
Fig. 1 is a front elevational view of the mixing valve with fragmentary showing of the supporting wall.

The thermostatically controlled mixing valve operates as follows:

Assume that control handle 23 is set at the position shown in Fig. 1, which indicates a water delivery temperature in an intermediate portion of the range, pinion 53 being therefore at an intermediate position on rack 52 as shown in Fig. 7. The control valve position as shown in Fig. 3 shows escape passage 44a closed by valve 56, but escape passage 44 is open.

Hot water entering supply passage 25 effects an upward pressure around the cut back recess 40 and tends to force regulating valve 35a upwardly. Water escapes upwardly around the piston, but mainly through metering slot 43a into pressure equalizing chamber 38a. When chamber 38a fills (there being at the moment no escape through passage 44a) the water pressure effective downwardly on piston 35a overcomes the water pressure effective upwardly, since the latter is applied over a smaller area, and the piston 35a moves downwardly towards closed position. For the moment, therefore, little or no hot water flows to mixing channel 28.

Referring to the situation in the cold water supply system, pressure of the cold water raises piston 35, and water begins to pass upwardly through metering slot 43 into pressure equalizing chamber 38. Control valve 46 is open, however (Fig. 3) and the pressure in the pressure relief chamber 38 is continuously partially vented past control valve 46, so that the pressure above regulating valve 35 is not at the moment sufficient to close valve 35. Cold water therefore passes downwardly from supply passage 27 past valve 35 to mixing channel 28, and upwardly and outwardly past thermostatic element 25.

The passage of cold water past the thermostat causes the element to contract, rotating bushing 51 and swinging arms 54 and 55 so that control valve 56 is allowed to open somewhat, while control valve 46 also closes somewhat. As a result, water pressure is vented from above control valve 56, regulating valve 35a rises, and hot water is permitted to pass from inlet 26 downwardly past the regulating valve 35a, and into the mixing channel 28. Simultaneously, as a result of the partial closure of control valve 46, pressure increases behind valve 35 which moves downwardly, reducing the flow of cold water to the mixing chamber.

An equilibrium condition is rapidly reached whereby the supply of hot and cold water is properly proportioned to achieve the temperature for which the thermostat was preset.

From the theoretical standpoint, it is apparent that for any given open position of a regulating valve, there is a cross sectional area of a tapered slot (for example at 43 in Fig. 6) which permits passage of a certain amount of water per unit of time. At the same time, the corresponding control valve (for example 46 in Fig. 3) may happen to be raised to permit escape of a certain volume of water per unit of time past the annular space between the valve face and shoulder 45. If the escape capacity past valve 45 exceeds the capacity of slot 43, pressure in the pressure equalization chamber 38 decreases, and valve 35 can rise to permit entry of more cold water to the mixing channel. If on the other hand the thermostat arm 54 depresses control valve 46, then the escape capacity past shoulder 45 decreases and pressure builds up in chamber 38 to depress valve 35 towards its seat. An equilibrium is constantly being sought and maintained, responsive to position of control valves 46 and 56, which are in turn controlled by the thermostatic element. By reason of the "see-saw" action of the arms 54 and 55 whenever the supply of cold water is increased the supply of hot water is decreased, and vice versa.

While regulating valves 35 and 35a are shown as mechanically independent of each other, it may occur to those skilled in the mechanical arts that a mechanical linkage could readily be devised which would cause one to open when the other closed, and vice versa. In this way a control could be devised requiring only one pressure equalizing chamber, and one control valve to permit venting of the said chamber responsive to thermostatic reaction to the temperature in the mixing channel.

It will be further apparent after consideration of the mixing valve structure above described and illustrated, that a satisfactory mixing valve can be devised in which, for example, the cold water supply passage furnishes a constant volume of cold water, while the hot water supply passage is provided with a regulating piston valve, and a control valve responsive to temperature in the mixed stream. A valve of this nature would embody the essence of my invention, but would not achieve to the fullest possible extent that flexibility of the embodiment illustrated, since its maximum breadth of temperature range would be limited by the fact that there would always be some cold water delivered to the mixing chamber.

I have shown and described one structure wherein cold and hot water supply sources are controlled by balancing pressures above and below a piston valve. It will be apparent to those skilled in the art that other expedients may be used to secure a variation in the effective cross sectional area of an escape passage whereby the pressures above and below the piston reach an equilibrium. Therefore, while I have illustrated and described a tapered slot in the piston skirt, it is to be understood that my invention comprises other means of achieving the same end, as limited only by the scope of the appended claims.

What I claim is:

1. A thermostatically controlled mixing valve for a hot and cold liquid supply system comprising a hollow valve body provided with an outer wall surrounding a mixing chamber, said wall having therethrough two supply passages, one for hot and one for cold liquid, said wall being further provided with a discharge passage from said mixing chamber, two by-pass passages within said wall respectively from the hot and cold supply passages to the mixing chamber, a portion of each by-pass passage being enlarged to define a pressure equalization chamber, each supply passage having a reduced orifice, a regulating piston valve having a tapered face portion biased to seat at said orifice, and by its relation to said orifice variably regulating flow of its supply stream therethrough, a movable control valve in each said by-pass passage between said pressure equalizing chamber and said mixing chamber and by its movement adapted to control flow through said by-pass passage, each piston having the end thereof opposite to its conical face extending into said pressure equalizing chamber, each piston valve being provided on its outer surface with a tapered metering slot extending from its conical face towards its opposite end to variably permit flow from its supply passage past the piston valve to the pressure equalizing chamber, and thermostatic means sensitive to temperature variations in the liquid stream in said mixing channel for automatically actuating the control valves in opposite directions, thereby to oppositely vary the pressure in the two pressure equalizing chambers, cause motion of the piston valves, and stabilize them in new flow regulating positions.

2. Valve mechanism as defined in claim 1 wherein the piston valve is provided with spring means adapted to bias the valve to its seat in any angular position when the valve is in idle condition.

LOUIS D. BIZAK.

REFERENCES CITED

The following references are of record in the file of this patent:

UNITED STATES PATENTS

| Number | Name | Date |
| --- | --- | --- |
| 1,046,236 | Wagner | Dec. 3, 1912 |
| 1,819,045 | Snediker | Aug. 18, 1931 |
| 1,869,663 | Cartier | Aug. 2, 1932 |
| 2,424,891 | Kirchhoff | July 29, 1947 |
| 2,449,766 | Brown | Sept. 21, 1948 |